(12) United States Patent
Stamatakis et al.

(10) Patent No.: US 11,765,490 B2
(45) Date of Patent: Sep. 19, 2023

(54) MONITORING SYSTEM FOR DISPLAYING RAW AND TRANSFORMED SENSOR DATA IN A USER INTERFACE

(71) Applicant: Senseware, Inc., Vienna, VA (US)

(72) Inventors: Julien G. Stamatakis, Centreville, VA (US); Serene Al-Momen, Centreville, VA (US)

(73) Assignee: Senseware, Inc., Vienna, VA (US)

( * ) Notice: Subject to any disclaimer, the term of this patent is extended or adjusted under 35 U.S.C. 154(b) by 0 days.

(21) Appl. No.: 17/951,510

(22) Filed: Sep. 23, 2022

(65) Prior Publication Data

US 2023/0122110 A1 Apr. 20, 2023

Related U.S. Application Data

(63) Continuation of application No. 17/238,341, filed on Apr. 23, 2021, now Pat. No. 11,457,292, which is a
(Continued)

(51) Int. Cl.
*G06F 15/16* (2006.01)
*H04Q 9/00* (2006.01)
(Continued)

(52) U.S. Cl.
CPC ........... *H04Q 9/00* (2013.01); *B60H 1/00842* (2013.01); *F24F 11/30* (2018.01); *F24F 11/58* (2018.01); *G01D 4/002* (2013.01); *G01D 4/006* (2013.01); *G06F 3/0482* (2013.01); *G06F 3/04842* (2013.01); *G08C 19/00* (2013.01); *H04B 1/38* (2013.01); *H04L 12/40* (2013.01); *H04L 41/04* (2013.01); *H04L 41/0809* (2013.01); *H04L 43/10* (2013.01); *H04L 67/02* (2013.01); *H04L 67/10* (2013.01); *H04L 67/12* (2013.01); *H04L 67/125* (2013.01); *H04W 4/021* (2013.01); *H04W 4/38* (2018.02); *H04W 4/70* (2018.02); *H04W 4/80* (2018.02); *H04W 24/02* (2013.01); *H04W 84/18* (2013.01); *F24F 11/0001* (2013.01); *F24F 2110/00* (2018.01); *G01D 4/004* (2013.01); *G08B 19/00* (2013.01); *H04L 2012/40228* (2013.01);
(Continued)

(58) Field of Classification Search
CPC .......... H04W 4/005; H04W 4/70; H04L 67/12
USPC ....................................................... 709/217
See application file for complete search history.

(56) References Cited

U.S. PATENT DOCUMENTS 6,437,692 B1 8/2002 Petite
6,735,550 B1 * 5/2004 Weekley ................. G06F 18/21
702/182
(Continued)

OTHER PUBLICATIONS

Cloud Logger, 38 Zeros, 2015.
(Continued)

*Primary Examiner* — Anthony Mejia

(57) ABSTRACT

The presentation of sensor network information can be provided to a user via a customized dashboard web interface. The dashboard web interface can be based on customized transformation and alert functions that can be applied to one or more sensor channels of data produced from sensors at a monitored location. The customized alerts can provide real-time monitoring of targeted conditions at the monitored location.

20 Claims, 10 Drawing Sheets

Related U.S. Application Data continuation of application No. 14/710,652, filed on May 13, 2015, now Pat. No. 10,993,097.

(60) Provisional application No. 62/136,959, filed on Mar. 23, 2015, provisional application No. 61/992,307, filed on May 13, 2014.

(51) Int. Cl.

| | | |
|---|---|---|
| *G01D 4/00* | (2006.01) | |
| *H04W 84/18* | (2009.01) | |
| *H04W 4/70* | (2018.01) | |
| *H04W 4/80* | (2018.01) | |
| *H04L 67/12* | (2022.01) | |
| *H04L 12/40* | (2006.01) | |
| *H04L 67/02* | (2022.01) | |
| *H04L 67/125* | (2022.01) | |
| *H04W 4/021* | (2018.01) | |
| *F24F 11/58* | (2018.01) | |
| *G06F 3/0482* | (2013.01) | |
| *G06F 3/04842* | (2022.01) | |
| *G08C 19/00* | (2006.01) | |
| *H04L 41/0806* | (2022.01) | |
| *H04W 24/02* | (2009.01) | |
| *H04L 43/10* | (2022.01) | |
| *H04L 67/10* | (2022.01) | |
| *H04L 41/04* | (2022.01) | |
| *H04W 4/38* | (2018.01) | |
| *F24F 11/30* | (2018.01) | |
| *B60H 1/00* | (2006.01) | |
| *H04B 1/38* | (2015.01) | |
| *G08B 19/00* | (2006.01) | |
| *H04W 92/06* | (2009.01) | |
| *H04W 88/16* | (2009.01) | |
| *F24F 110/00* | (2018.01) | |
| *F24F 11/00* | (2018.01) | |

(52) U.S. Cl.
CPC ..... *H04Q 2209/10* (2013.01); *H04Q 2209/40* (2013.01); *H04Q 2209/43* (2013.01); *H04Q 2209/60* (2013.01); *H04Q 2209/80* (2013.01); *H04Q 2209/82* (2013.01); *H04W 88/16* (2013.01); *H04W 92/06* (2013.01)

(56) References Cited

U.S. PATENT DOCUMENTS

| | | | |
|---|---|---|---|
| 7,142,107 B2 | 11/2006 | Kates | |
| 7,379,981 B2 | 5/2008 | Elliott et al. | |
| 8,051,489 B1 | 11/2011 | Montenegro | |
| 8,103,389 B2 | 1/2012 | Golden et al. | |
| 8,339,069 B2 | 12/2012 | Chemel | |
| 9,534,929 B1 | 1/2017 | Stamatakis et al. | |
| 9,534,930 B1 | 1/2017 | Stamatakis | |
| 9,538,578 B1 | 1/2017 | Stamatakis et al. | |
| 9,551,594 B1 | 1/2017 | Stamatakis | |
| 9,554,236 B1 | 1/2017 | Stamatakis | |
| 9,714,843 B1 | 7/2017 | Stamatakis et al. | |
| 9,714,844 B1 | 7/2017 | Stamatakis et al. | |
| 9,756,511 B1 | 9/2017 | Stamatakis et al. | |
| 9,762,979 B1 | 9/2017 | Stamatakis et al. | |
| 9,763,118 B1 | 9/2017 | Stamatakis et al. | |
| 9,800,646 B1 | 10/2017 | Stamatakis et al. | |
| 9,813,489 B1 | 11/2017 | Stamatakis et al. | |
| 9,876,653 B1 | 1/2018 | Stamatakis | |
| 9,888,336 B1 | 2/2018 | Stamatakis | |
| 9,942,693 B2 | 4/2018 | Stamatakis | |
| 9,986,411 B1 | 5/2018 | Stamatakis | |
| 10,142,196 B1 | 11/2018 | Stamatakis et al. | |
| 10,143,038 B1 | 11/2018 | Stamatakis | |
| 10,149,141 B1 | 12/2018 | Stamatakis et al. | |
| 10,171,891 B1 | 1/2019 | Stamatakis | |
| 10,171,972 B2 | 1/2019 | Stamatakis et al. | |
| 10,176,208 B2* | 1/2019 | Chen | G06F 3/06 |
| 10,178,638 B1 | 1/2019 | Stamatakis et al. | |
| 10,237,631 B2 | 3/2019 | Stamatakis et al. | |
| 10,263,841 B1 | 4/2019 | Stamatakis et al. | |
| 10,313,149 B2 | 6/2019 | Stamatakis | |
| 10,313,197 B1 | 6/2019 | Stamatakis | |
| 10,334,417 B2 | 6/2019 | Stamatakis et al. | |
| 10,536,838 B2 | 1/2020 | Stamatakis | |
| 10,542,331 B2 | 1/2020 | Stamatakis | |
| 10,652,767 B1 | 5/2020 | Stamatakis | |
| 10,687,231 B1 | 6/2020 | Stamatakis | |
| 10,798,554 B2 | 10/2020 | Stamatakis et al. | |
| 10,805,697 B2 | 10/2020 | Stamatakis et al. | |
| 10,833,893 B2 | 11/2020 | Stamatakis et al. | |
| 10,932,319 B2 | 2/2021 | Stamatakis | |
| 10,951,961 B2 | 3/2021 | Stamatakis et al. | |
| 10,992,493 B2 | 4/2021 | Stamatakis | |
| 10,993,097 B1 | 4/2021 | Stamatakis et al. | |
| 11,089,388 B2 | 8/2021 | Stamatakis et al. | |
| 11,089,390 B2 | 8/2021 | Stamatakis | |
| 11,184,257 B2 | 11/2021 | Stamatakis et al. | |
| 11,197,146 B2 | 12/2021 | Stamatakis et al. | |
| 11,259,099 B2 | 2/2022 | Stamatakis | |
| 11,457,292 B2 | 9/2022 | Stamatakis et al. | |
| 11,470,462 B2 | 10/2022 | Stamatakis et al. | |
| 11,509,976 B2 | 11/2022 | Stamatakis et al. | |
| 11,528,161 B2 | 12/2022 | Stamatakis | |
| 11,546,677 B2 | 1/2023 | Stamatakis | |
| 2006/0059224 A1 | 3/2006 | Yao | |
| 2007/0093974 A1 | 4/2007 | Hoogenboom | |
| 2007/0211681 A1 | 9/2007 | Sun et al. | |
| 2007/0229285 A1 | 10/2007 | Smith | |
| 2008/0195584 A1 | 8/2008 | Nath | |
| 2009/0243852 A1 | 10/2009 | Haupt | |
| 2010/0070618 A1 | 3/2010 | Kim | |
| 2010/0082988 A1 | 4/2010 | Huebner | |
| 2011/0040809 A1 | 2/2011 | Spanier | |
| 2011/0197064 A1 | 8/2011 | Garcia Morchon | |
| 2011/0248857 A1 | 10/2011 | Rutherford | |
| 2012/0008783 A1 | 1/2012 | Montenegro | |
| 2012/0098446 A1 | 4/2012 | Kim | |
| 2012/0197852 A1* | 8/2012 | Dutta | H04L 67/565 |
| | | | 707/E17.005 |
| 2012/0197898 A1* | 8/2012 | Pandey | H04L 67/12 |
| | | | 707/741 |
| 2012/0197911 A1* | 8/2012 | Banka | G06F 16/951 |
| | | | 707/754 |
| 2012/0258903 A1 | 10/2012 | Bjelopavlic | |
| 2012/0311413 A1 | 12/2012 | Pelletier | |
| 2013/0276144 A1* | 10/2013 | Hansen | H04L 63/08 |
| | | | 726/29 |
| 2014/0122022 A1* | 5/2014 | Chen | G06F 16/2477 |
| | | | 702/187 |
| 2014/0122729 A1* | 5/2014 | Hon | H04N 1/00244 |
| | | | 709/228 |
| 2014/0126581 A1 | 5/2014 | Wang | |
| 2014/0300489 A1 | 10/2014 | Rice | |
| 2014/0337256 A1 | 11/2014 | Varadi | |
| 2014/0359133 A1 | 12/2014 | Tian | |
| 2015/0012147 A1 | 1/2015 | Haghighat-Kashani | |
| 2015/0029022 A1 | 1/2015 | Stebbins | |
| 2015/0156213 A1 | 6/2015 | Baker | |
| 2015/0277407 A1 | 10/2015 | Vanderkoy | |
| 2015/0316945 A1 | 11/2015 | Soya | |
| 2015/0381738 A1 | 12/2015 | Azuma | |
| 2016/0006264 A1 | 1/2016 | Alperin | |
| 2016/0066068 A1 | 3/2016 | Schultz | |
| 2016/0112518 A1 | 4/2016 | Haleem et al. | |
| 2016/0121487 A1 | 5/2016 | Mohan | |
| 2016/0241445 A1 | 8/2016 | Kim | |
| 2016/0261481 A1* | 9/2016 | Ogata | G05B 23/0264 |
| 2017/0262014 A1 | 9/2017 | Laycock | |

(56) References Cited

U.S. PATENT DOCUMENTS

2018/0095135 A1    7/2018   Kawasaki
2018/0198688 A1    7/2018   Dawes

OTHER PUBLICATIONS

Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxure solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxture Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
DOLPHIN Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
ISelect Adds New Portfolio Company: Bractlet, 2015.
Know—Bractlet, Mar. 7, 2016 (printed).
Analyze—Bractlet, Mar. 7, 2016 (printed).
Ensure—Bractlet, Mar. 7, 2016 (printed).
Announcing Samsara: Internet connected sensors, May 18, 2015.
Samsara—Internet Connected Sensors, Mar. 7, 2016 (printed).
Samsara—Features, Mar. 7, 2016 (printed).
Samsara—Models, Mar. 7, 2016 (printed).
Samsara—API, Mar. 7, 2016 (printed).
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.
First Action Interview Pilot Program Pre-Interview Communication, U.S. Appl. No. 14/862,280, dated Mar. 8, 2017.
First Action Interview Pilot Program Pre-Interview Communication, U.S. Appl. No. 14/996,442, dated Dec. 6, 2017.
Office Action, U.S. Appl. No. 15/790,123, dated Jul. 25, 2018.
Final Office Action, U.S. Appl. No. 15/790,123, dated Jan. 4, 2019.
Office Action, U.S. Appl. No. 15/790,123, dated Jul. 15, 2020.

\* cited by examiner

MONITORING SYSTEM FOR DISPLAYING RAW AND TRANSFORMED SENSOR DATA IN A USER INTERFACE

This application is a continuation of non-provisional application Ser. No. 17/238,341, filed Apr. 23, 2021, which is a continuation of non-provisional application Ser. No. 14/710,652, filed May 13, 2015, which claims the benefit of and priority to provisional application No. 61/992,307, filed May 13, 2014, and to provisional application No. 62/136,959, filed Mar. 23, 2015. Each of the above-identified applications are incorporated herein by reference in its entirety.

BACKGROUND

Field

The present disclosure relates generally to sensor applications, including a system, method and apparatus for the distribution of wireless sensor network information.

Introduction

Sensors can be used to monitor physical or environmental conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing the state of physical or environmental conditions. Wireless sensor networks provide an efficient mechanism for connecting with and retrieving sensor data from a distributed set of sensors. The growing emphasis on the Internet of Things (IoT) has further reinforced the importance of wireless networks in connecting a range of devices. Notwithstanding today's emphasis on connecting a variety of devices using wireless communication, it is recognized in the present disclosure that the penetration of wireless sensor networks into the marketplace is limited due to the high level of installation and maintenance costs.

By their very nature, sensors are designed to measure a particular physical or environmental condition. Sensors therefore represent a class of application-specific devices. Every sensor network installation can be designed with unique cost constraints, measurement objectives, site restrictions, or other application-specific requirements that can influence sensor network design. These application-specific qualities lead to significant challenges in identifying a scalable solution that can be applied across various industries and markets. For example, it is recognized that a scalable solution should be flexible in accommodating new types of sensor applications with little redesign or redeployment of a wireless sensor network. Such a scalable solution would significantly reduce installation and maintenance costs as new sensors and application features are rolled out across an already deployed sensor network infrastructure. It is recognized that sensor network solutions should enable an evolution of the deployed wireless sensor network without wasting previously-deployed wireless sensor network elements or requiring significant time or expense in modifying the previously-deployed wireless sensor network.

Figure 1:
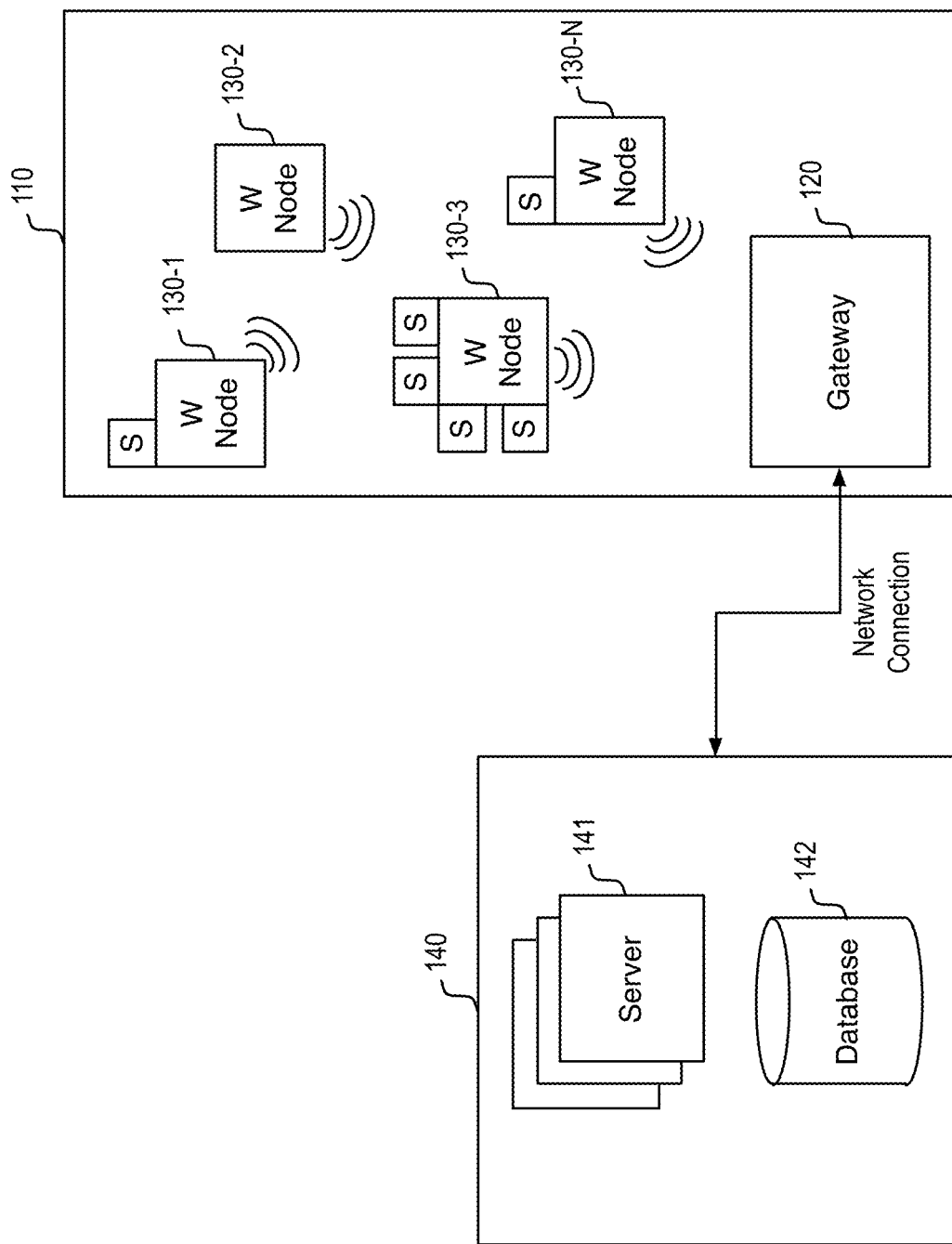
FIG. 1 illustrates an example embodiment of a wireless sensor network that can collect and distribute sensor information.

FIG. 1 illustrates an example embodiment of a wireless sensor network that can collect and distribute sensor information. The wireless sensor network can be configured to collect and distribute sensor information that is based on measurements by sensors deployed at monitored location 110. Monitored location 110 can represent any area where a collection of sensors is deployed. Monitored location 110 may or may not represent a physical area having clearly defined boundaries. As would be appreciated, the extent of the monitoring application itself provides a sense of boundary to monitored location 110. In one example, monitored location 110 can represent a building such as a home, hotel, school, community building, stadium, convention center, warehouse, office building, multi-dwelling unit, or other defined building structure. In another example, monitored location 110 can represent an area of control such as a monitored area that can be fixed or movable.

Disposed within monitored location 110 is a plurality of sensors. Communication between the plurality of sensors and gateway device 120 is facilitated by a set of wireless nodes 130-*n*. In general, wireless nodes 130-*n* can be configured to form a wireless mesh network. In one embodiment, the communication protocol between wireless nodes 130-*n* is based on the IEEE 802.15.4 protocol. A wireless mesh network can be formed between wireless nodes 130-*n* and can be used to facilitate communication between any wireless node 130-*n* and gateway device 120.

A wireless node 130-*n* can be configured to support one or more sensor module units (S), each of which can be individually coupled to a wireless node 130-*n* via a plugand-play universal sensor interface. The plug-and-play universal sensor interface facilitates the separation of the wireless node communication infrastructure from the set of one or more sensor module units that are deployed at the location at which the supporting wireless node 130-$n$ is installed. This separation creates significant flexibility in choice of sensors that may or may not be deployed proximate to the time of installation of the supporting wireless node 130-$n$. As such, the plug-and-play universal sensor interface enables a sensor network solution to respond to changes in the sensor application requirements at monitored location 110 without incurring significant re-deployment costs.

This flexibility would not be available if sensors were integrated with a wireless node. When a wireless node is deployed with integrated sensors, the monitoring capability of the wireless node is limited to the sensors that were pre-installed in the wireless node. This pre-installation would fix the capability of the wireless node at the time of deployment and would limit the wireless node to a static sensor application objective. Thus, if a defective sensor needs to be replaced, or if another type of sensor needs to be added to meet a dynamic sensor application objective, then the wireless node would need to be replaced or otherwise modified. This would impact at least part of the wireless sensor network infrastructure, which can result in sensor network downtime at the monitored location. A further impact would be produced as the maintenance expense of such a replacement or modification would be prohibitive.

In the present disclosure, the plug-and-play universal sensor interface enables the sensor module units to be deployed separately from wireless nodes 130-$n$. The plug-and-play universal sensor interface allows any type of sensor module unit to be connected to any wireless node 130-$n$ at any time and without any reconfiguration of the supporting wireless network infrastructure. This feature allows great flexibility in the deployment and modification of wireless sensor networks at a lower price point. Additionally, the plug-and-play universal sensor interface enables the monitoring capabilities of the wireless sensor network to scale seamlessly with the dynamic nature of changing sensor application objectives.

In one example, a wireless node 130-$n$ can be configured to support four sensor module units. As would be appreciated, the particular number of sensor module units that can be supported by a wireless node 130-$n$ can vary. Sensor module units can be added onto wireless nodes 130-$n$ sequentially at different deployment times. Thus, for example, a first sensor module unit can be added at a time of installation of the wireless node 130-$n$, with one or more additional sensor module units added to the same wireless node 130-$n$ in the future as needed to address changing sensor application objectives.

In one embodiment, each of the sensor module units can support a plurality of individual sensors. In one example, a sensor module unit can support a set of eight sensors. In this example, the set of eight sensors can include sensors of one or more types. For example, sensors in a sensor module unit can include one or more of the following: a temperature sensor, a humidity sensor, an air quality sensor (e.g., $CO_2$ sensor), a light sensor, a sound sensor, a contact sensor, a pulse sensor, a water sensor, or any other type of sensor configured to measure a characteristic of a part of monitored location 110. A sensor module unit can include multiple sensors of a single type. For example, a particular configuration of a sensor module unit can include four pulse sensors, one temperature sensor, one humidity sensor, one air quality sensor, and one light sensor. In another example, a particular configuration of a sensor module unit can include eight sensors of a single type. As would be appreciated, the set of sensors included within a particular sensor module unit can be chosen to meet a given sensor application objective.

In the present disclosure, it is recognized that sensor module units can be targeted or otherwise designed for a particular class of sensor applications. For example, one sensor module unit can be designed for sensor applications targeted to school buildings, while another sensor module unit can be designed for sensor applications targeted to office buildings. The sensor module unit targeted for school building use can include a set of sensors that are popular with school building sensor applications. For instance, the set of sensors can include pulse sensors for measuring utility consumption (e.g., gas, water, electricity), a temperature sensor, an air quality sensor, a humidity sensor and a light sensor. The sensor module unit targeted for school building use can then be selected for installation with wireless nodes deployed in school buildings. In this manner, a relatively generic sensor module unit can be deployed across many sensor application deployments in various schools without requiring full customization for a specific application at a particular school. Production costs of the sensor module units are thereby minimized without any loss of flexibility in deploying customized sensor module units.

The impact on economies of scale can be readily appreciated. Wireless node modules can be produced on a larger manufacturing scale because the generic wireless nodes can be applied in many types of monitored locations in a manner that is separate from the particular sensor objectives at the particular monitored location. Correspondingly, a limited number of types of sensor module units can be manufactured. For example, a first sensor module unit type can be produced for office building applications and can include a suite of sensors typically used in office buildings. Similarly, a second sensor module unit type can be produced for school building applications and can include a suite of sensors typically used in school buildings.

In the deployment at a particular monitored location, the generic wireless nodes can be installed at the particular monitoring points in the monitored location with the particular type of sensor module unit attached to the generic wireless node to meet the particular needs at that monitoring point. Customization of this nature is far superior to the limited options presented by integrated devices. Customization need not result in wireless sensor network downtime and can be effected through the selective coupling of particular sensor module units to wireless nodes.

A further benefit of this form of customization is that it obviates the need to re-qualify and test wireless nodes to meet a new sensor application. Qualification need only be performed on new sensor module units since the existing wireless network infrastructure provided by the generic wireless nodes had previously been qualified and tested. This reduces the time needed to bring new sensor network features to market in addressing new market opportunities. If, on the other hand, sensors were integrated with the wireless nodes, then the entire device would need to be re-qualified and tested before being brought to market. As described, the plug-and-play universal sensor interface enables sensor network application customization without increasing installation and maintenance costs of the sensor network infrastructure.

Returning to FIG. 1, wireless node 130-1 is illustrated as supporting a single sensor module unit (S). Wireless node 130-2, on the other hand, is illustrated as not supporting any sensor module units. This example illustrates a scenario where wireless node 130-2 has been specifically installed as a wireless relay node in a wireless mesh network to facilitate a connection between wireless node 130-1 and gateway 120. As further illustrated, wireless node 130-3 supports four different sensor module units (S). This example illustrates a scenario where the sensing needs of a particular part of monitored location 110 is greater and would therefore require additional installed sensors at the location of wireless node 130-3. For instance, wireless node 130-3 can be installed in a hub of sensing activity at monitored location 110, while wireless node 130-1 or wireless node 130-N can be installed in a periphery of sensing activity at monitored location 110. The plug-and-play universal sensor interface enables sensor module unit deployment to match sensor application needs in a manner that scales seamlessly with the deployed wireless network infrastructure. Deployment and maintenance costs are thereby contained.

The wireless mesh network created by wireless nodes 130-n facilitates communication between sensor module units and gateway 120 via the wireless network infrastructure established by wireless nodes 130-n. Gateway 120 can be installed at monitored location 110 and can be provided with network connectivity. For example, gateway 120 can be provided with a network connection that facilitates communication of sensor data to host system 140. The network connection can be embodied in various forms depending upon the particular characteristics of monitored location 110.

For example, where monitored location 110 is a building in a developed area, then the network connection can be facilitated by a wired Internet connection via an Internet service provider. In another example, where monitored location 110 represents a remote physical area (or movable area) that may or may not include a building structure, then the network connection can be facilitated by a terrestrial or satellite based wireless network. As would be appreciated, the principles of the present disclosure would not be dependent on the particular form of network connection supported by gateway 120 in communicating with host system 140.

The network connection between gateway 120 and host system 140 enables the collection of sensor data by host system 140. In one embodiment, host system 140 can be located in a location remote from gateway 120. In general, host system 140 can be configured to perform a collection of sensor data from monitored location 110, storage of sensor data in database 142, and a distribution of sensor data to one or more destinations. As illustrated, host system 140 can include one or more servers 141 that can facilitate the collection, storage and distribution processes.

Figure 2:
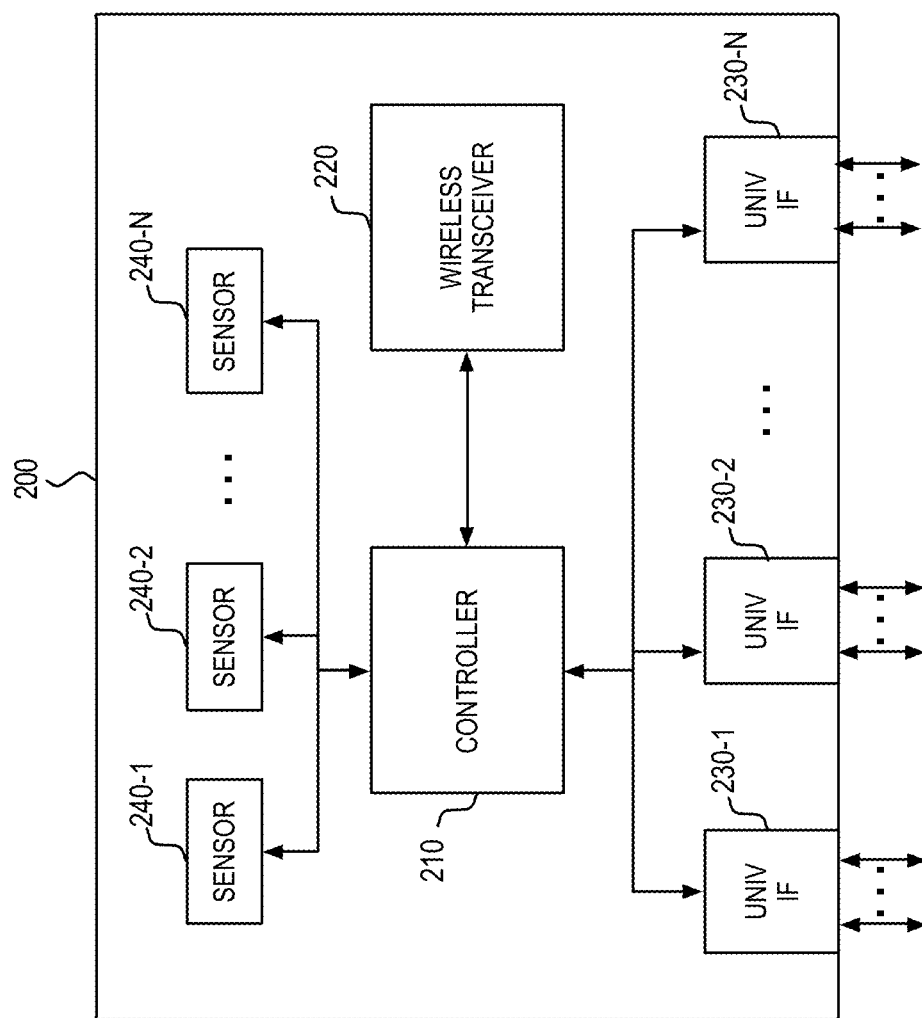
FIG. 2 illustrates an example embodiment of a wireless node.

As described, wireless nodes 130-n provide a wireless network infrastructure upon which sensor module units can be deployed for a customized sensor application. FIG. 2 illustrates an example embodiment of a wireless node. As illustrated, wireless node 200 includes controller 210 and wireless transceiver 220. In one embodiment, wireless node 200 can be powered via a battery source (not shown). In another embodiment, wireless node 200 can be powered via an external power source available at the point of installation at the monitored location.

Wireless transceiver 220 facilitates wireless communication between wireless node 200 and a gateway or another wireless node that operates as a relay between wireless node 200 and the gateway. The sensor data communicated by wireless transceiver 220 is collected by controller 210 via one or more universal sensor interfaces 230-n. Each universal sensor interface 230-n can support connection of wireless node 200 with a separate sensor module unit that can be attached to wireless node 200.

Universal sensor interfaces 230-n can represent a combination of hardware and software. The hardware portion of universal sensor interfaces 230-n can include a wired interface that enables communication of different signals between wireless node 200 and a connected sensor module unit. In one example, the wired interface can be enabled through a connector interface, which is exposed by the housing of the wireless node 200, and that is configured to receive a sensor module unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 210 in wireless node 200 to select the particular sensor module unit with which wireless node 200 desires to communicate. The software portion of the universal sensor interfaces 230-n can include a protocol that allows wireless node 200 to communicate with a sensor module unit.

In one example protocol, controller 210 can be configured to poll the various universal sensor interfaces 230-n to determine whether any sensor module units are connected. As part of this protocol, controller 210 can first request a sensor ID from a sensor module unit. If the response read is 0, then controller 210 would know that no sensor module unit is connected to that universal sensor interface 230-n. If, on the other hand, the response read is not 0, then controller 210 would ask for the number of data values that have to be retrieved and the number of bits on which the data values are coded. In one example, the higher order 8-bits of a 16-bit communication between controller 210 and a sensor module unit identifies the number of data values, while the lower order 8-bits of the 16-bit communication identifies the number of bits used to code each data value. Based on the number of data values to be retrieved, controller 210 would then collect that number of data values, wherein each value can represent a different sensor channel of the sensor module unit.

In one example, a wireless node can be configured for coupling to four different sensor module units. If each of the sensor module units can include up to eight sensors, then the wireless node can be configured to communicate 32 sensor channels of data to the gateway via wireless transceiver 220.

In the illustration of FIG. 2, wireless node 200 also includes one or more sensors 240-n. In one example, sensors 240-n can be contained within or otherwise supported by the housing of wireless node 200. In various scenarios, the one or more sensors 240-n can facilitate monitoring at that part of the monitored location, including the health and/or status of wireless node 200. In one example configuration, sensors 240-n can include a temperature sensor, a humidity sensor, a voltage sensor, a link quality sensor, or any other sensor that can be used to facilitate the sensing needs of wireless node 200.

As noted, wireless nodes can be designed as a generic communication node upon which customized sensing functionality can be added through the connection of particular sensor module units. In this framework, the wireless nodes can be constructed with base communication functionality that can operate independently of particular sensors. As such, the wireless nodes can provide a relatively stable wireless network infrastructure that can support multiple generations of sensor module units. As would be appreciated, the requirements of the sensor module units would be dependent on the particular sensing application. For example, a first sensor module unit can be designed with a first generation sensor having a first degree of accuracy, reliability, or other sensor characteristic, while a second sensor module unit can be designed with a second generation sensor of the same type having a second degree of accuracy, reliability, or other sensor characteristic. As this example illustrates, different generations of sensor module units can be attached to the same wireless node using the plug-and-play universal sensor interface. The original investment in the wireless node would not be lost should the second sensor module unit replace the originally-installed first sensor module unit. A low-cost evolutionary path of the wireless sensor network would therefore be enabled that could scale seamlessly with a customer's needs, sensor technology, or other factor that implicates a sensor module unit modification.

Figure 3:
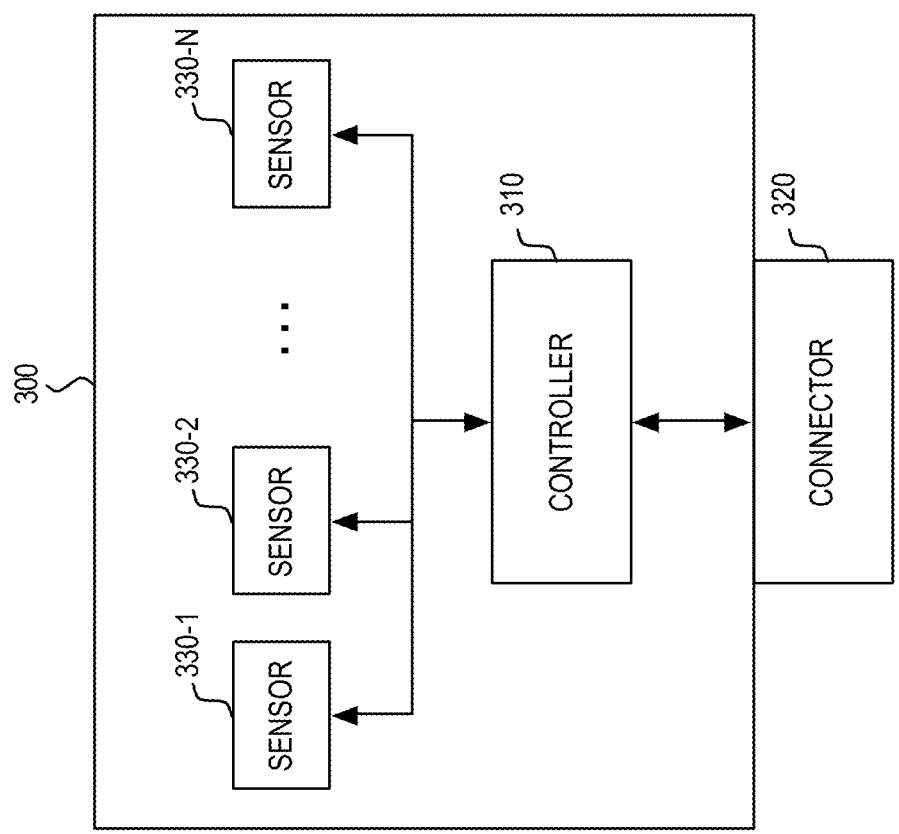
FIG. 3 illustrates an example embodiment of a sensor module unit.

FIG. 3 illustrates an example embodiment of a sensor module unit designed for attachment to a wireless node. As illustrated, sensor module unit 300 includes controller 310 that communicates over a universal sensor interface with the wireless node. In one embodiment, sensor module unit 300 supports a connector 320 configured for pluggable, removable insertion into a connector interface exposed by the wireless node. In another embodiment, the sensor module unit can be coupled to the connector interface exposed by the wireless node via a connector attached to a cable.

Sensor module unit 300 can include a plurality of sensors 330-$n$. In one example, sensor module unit 300 includes up to eight sensors of one or more types. In the present disclosure, it is recognized that a sensor module unit can be pre-populated with a suite of sensors targeted to a particular class of sensor applications. In this framework, a first suite of sensors can be used in a first sensor module unit targeted to a first sensor application (e.g., school buildings), while a second suite of sensors can be used in a second senor module unit targeted to a second sensor application (e.g., office buildings) different from the first sensor application. Here, the underlying wireless network infrastructure can remain the same while particular sensor module units are chosen for coupling to one or more wireless nodes to facilitate a particular sensor application at a monitored location.

Figure 4:
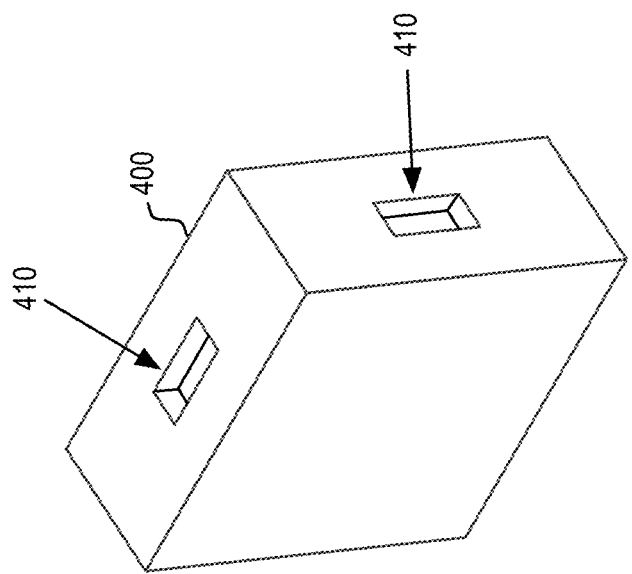
FIG. 4 illustrates an example embodiment of a housing of a wireless node that exposes connector interfaces.

The plug-and-play nature of the connection of sensor module units to supporting wireless nodes facilitates a modular framework of installation of a wireless sensor network. FIG. 4 illustrates an example embodiment of a housing of a wireless node that exposes a plurality of connector interfaces to produce the modular framework. As illustrated, wireless node 400 can have a housing configured to expose a plurality of connector interfaces 410. Each of the plurality of connector interfaces 410 can support the physical attachment of a single sensor module unit. In the example illustration, each side of the housing of wireless node 400 exposes a single connector interface 410. In the present disclosure, it is recognized that the housing of the wireless node can be substantially larger than the housing of the sensor module unit. This can result, for example, because the wireless node can be designed with additional components such as an internal power source (e.g., battery) that can involve additional volume requirements as compared to the sensor module units. It is therefore recognized that one embodiment of a wireless node can have multiple sensor module units physically attached to a single side of the wireless node.

Figure 5:
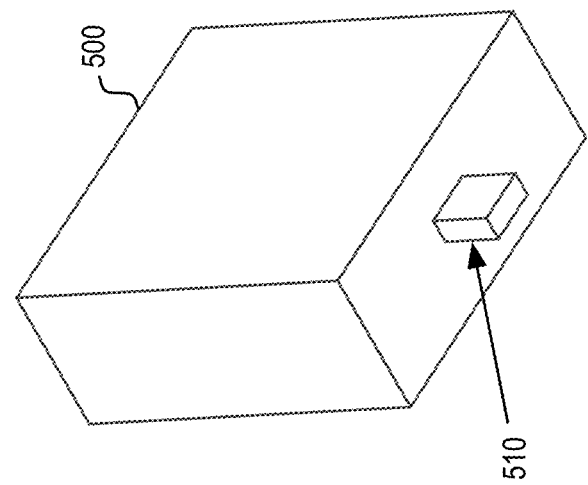
FIG. 5 illustrates an example embodiment of a housing of a sensor module unit.

FIG. 5 illustrates an example embodiment of a housing of a sensor module unit that enables the modular framework. As illustrated, sensor module unit 500 supports a connector 510 that can be configured for pluggable, removable insertion into a corresponding connector interface 410 exposed by the housing of wireless node 400. The connection of sensor module unit 500 to wireless node 400 via the insertion of connector 510 into connector interface 410 produces a true plug-and-play framework of wireless sensor network deployment.

Figure 6:
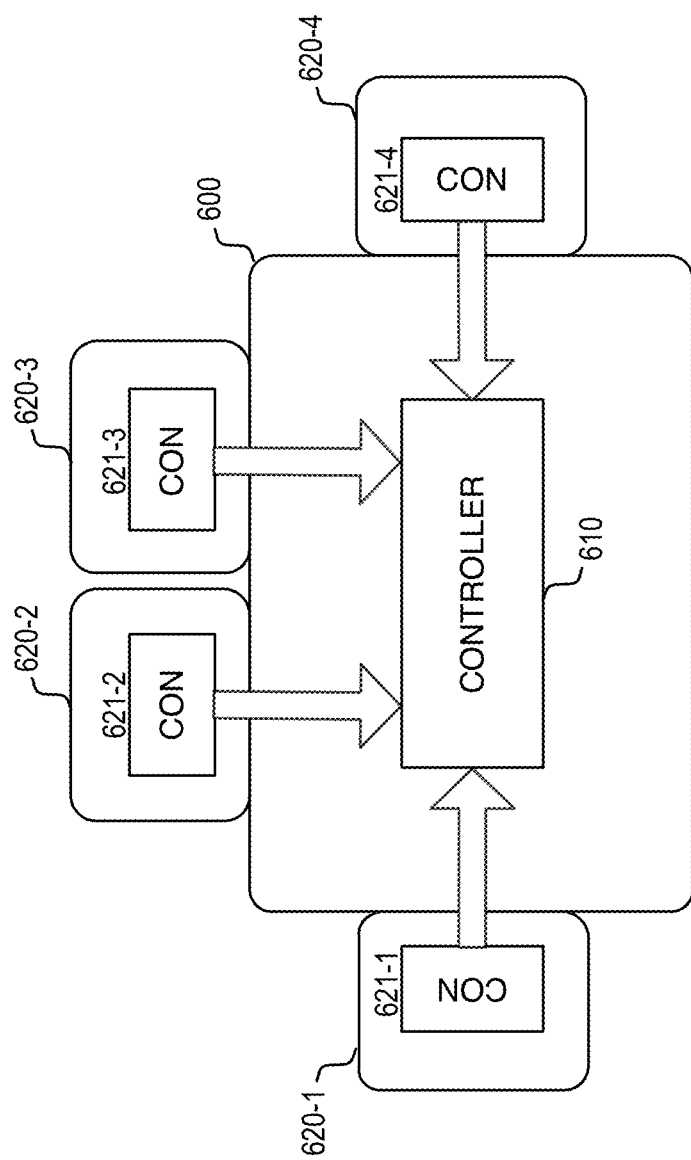
FIG. 6 illustrates an example embodiment of a wireless node that is physically attached to a plurality of sensor module units.

FIG. 6 illustrates an example embodiment of a wireless node that is physically attached to a plurality of sensor module units via universal sensor interfaces. As illustrated, wireless node 600 is attached to sensor module unit 620-1, sensor module unit 620-2, sensor module unit 620-3, and sensor module unit 620-4 via four connector interfaces exposed by the housing of wireless node 600. The attachment of sensor module unit 620-1 to wireless node 600 enables communication of sensor data between controller 621-1 and controller 610. The attachment of sensor module unit 620-2 to wireless node 600 enables communication of sensor data between controller 621-2 and controller 610. The attachment of sensor module unit 620-3 to wireless node 600 enables communication of sensor data between controller 621-3 and controller 610. Finally, the attachment of sensor module unit 620-4 to wireless node 600 enables communication of sensor data between controller 621-4 and controller 610. Each of sensor module units 620-1 to 620-4 can be coupled to wireless node 600 via a separate universal sensor interface having the connectivity characteristics described above.

Controller 610 in wireless node 600 can communicate with each of sensor module units 620-1 to 620-4 to retrieve sensor data generated by one or more sensors on the respective sensor module units 620-1 to 620-4. In one embodiment, the sensor channels of data that are communicated from sensor module unit 620-$n$ to wireless node 600 are configurable. As noted, communication between controller 610 and the sensor module units 620-1 to 620-4 can be based on a protocol that enables identification of the number of data values that are transmitted from each of sensor module units 620-1 to 620-4 to controller 610.

In one embodiment, a sensor module unit can be configured to transmit data from only a subset of the sensors on the sensor module unit. To illustrate this embodiment, consider again the example of a sensor module unit targeted for school building use. In this example, the sensor module unit can include a standard suite of eight sensors, including four pulse sensors for measuring utility consumption (e.g., gas, water, electricity), a temperature sensor, an air quality sensor, a humidity sensor and a light sensor. Individual sensors in this standard suite of sensors can be activated selectively such that only a subset of the sensor channels of data is forwarded from the sensor module unit to the wireless node.

Here, it is recognized that the selective transmission of sensor channels of data can be used to support efficient wireless bandwidth use or reduced power consumption within the wireless sensor network at the monitored location. Moreover, the selective transmission of sensor channels of data can support a billing model where customers pay per sensor channel stream of data that is exposed by the host system to the customer.

In the present disclosure, the distribution of sensor information to customers can be customized based on a customer's needs. In one application, the sensor channels of data that are delivered to a particular customer can be customized to address divergent interests and needs of customers in the sensor channels of data produced at a monitored location. For example, an office building may have multiple tenants that lease office space in the building, a restaurant that leases space in the ground level of the office building, a building supervisor responsible for the maintenance of the office building, a concierge responsible for the administration of common space in the office building, and additional parties having at least partial responsibility of a segment of a space or resource in the office building. Each of the parties in this example can have different responsibilities in the office building, and therefore can have different interests/needs with respect to sensor channels of data generated by the various sensors installed in the office building. A customized distribution of sensor channels of data can therefore be defined such that parties having different responsibilities at a monitored location can be given a partial view of the totality of the sensor channels of data generated by the various sensors installed at the monitored location.

In addition to the selective distribution of the sensor channels of data, the presentation of sensor information based on one or more sensor channels of data can also be customized. In one example, customized alerts based on one or more sensor channels of data can be defined for presentation to a customer. In a simple example, a customized alert can be based on a single sensor channel of data where an alert can be triggered based on a comparison of a sensor data value (e.g., temperature) to an alert threshold value. As would be appreciated, a customized alert can be unique to that particular sensor channel of data as sensor application needs across the monitored location can vary. In a more complex example, a customized alert can be based on multiple sensor channels of data. For instance, an alert can be triggered based on an analysis of multiple sensor channels of data that are combined into a single monitored value (e.g., alert analysis based on a monitored value produced by the fxn(sensor1, sensor2, . . . sensorN)). In another scenario, an alert can be triggered based on a combinatorial analysis of multiple monitored conditions (e.g., (sensor1>X1 AND sensor2>X2) OR sensor3<X3).

Figure 7:
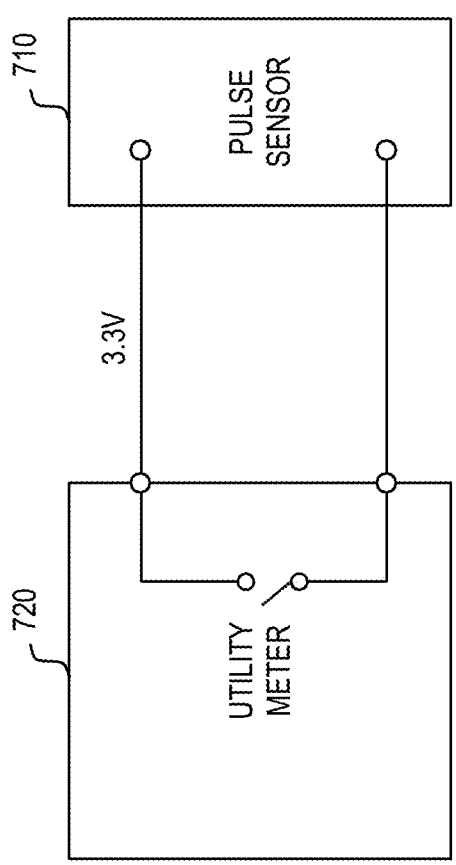
FIG. 7 illustrates an example embodiment of a pulse sensor.

Here, it should be noted that an alert function can be based on the raw data value of a particular sensor or a transformed data value produced using the raw data value of a particular sensor. To illustrate this distinction, consider the example of the pulse sensor illustrated in FIG. 7. As illustrated, pulse sensor 710 can be coupled to utility meter 720 via a pair of conductors. The actual wired interface between pulse sensor 710 and utility meter 720 can vary depending on the type of utility meter that is present. As illustrated, pulse sensor 710 can be configured to provide 3.3V on a first conductor. Utility meter 720 includes a dry contact relay that would successively relay the 3.3V provided by pulse sensor 710 and then open the relay. In one example, a first state of the relay can correspond to a first part of a disk rotation, while a second state of the relay can correspond to a second part of a disk rotation. Where the first state of the relay corresponds to a first half of the disk rotation and the second state of the relay corresponds to a second half of the disk rotation, then a full rotation of the disk would encounter two changes in state of the sensed value at pulse sensor 710. As would be appreciated, utility meters can be defined such that a different number of state changes in the relay can be produced for a single disk rotation. Thus, while pulse sensor 710 can measure the number of changes in the state of the relay at utility meter 720 over a period of time, pulse sensor 810 would not know how many disk rotations actually occurred at utility meter 720 in that period of time. Without knowledge of the number of disk rotations that actually occurred at utility meter 720, information about the amount of a utility service consumed would not be available.

The same pulse sensor can be used to measure relay transitions in many different types of utility meters having different rates of correspondence between relay transitions and disk rotations. In converting the measured number of relay transitions into useful information, a transformation function can be defined to perform the conversion of raw sensor data into sensor information. Consider a simple example of a utility meter that has four relay transitions per disk rotation. In this example, a first transformation function (divide by four) can be a defined such that the number of detected relay state transitions by the pulse sensor is divided by four to produce a corresponding number of disk rotations. The number of disk rotations could then be converted by a second transformation function into an actual consumption quantity of the utility measured by the utility meter. As would be appreciated, the combination of the first and second transformation function can be defined to match the particular characteristics of the utility meter being monitored to produce useful sensor information.

Figure 8:
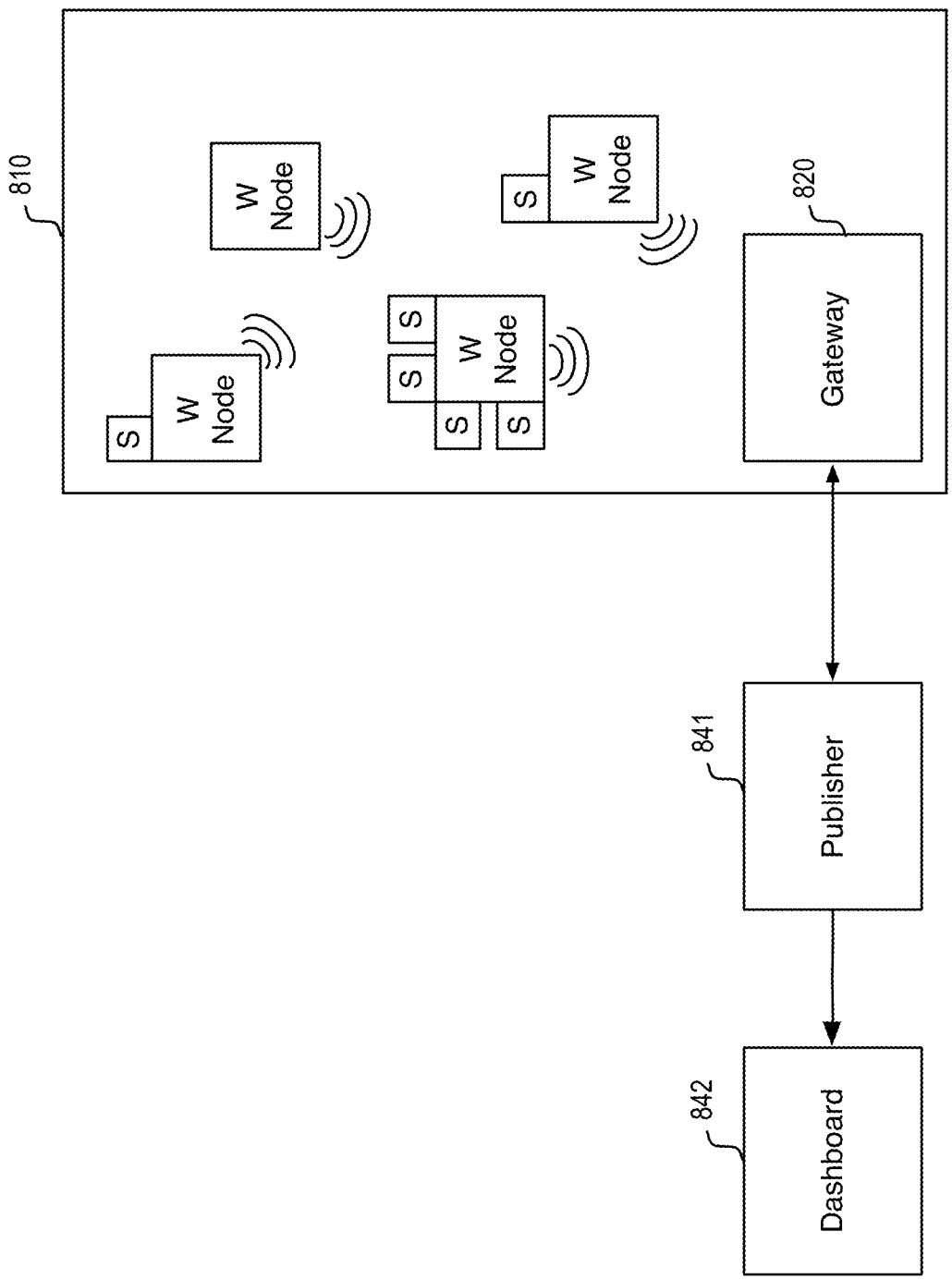
FIG. 8 illustrates an example embodiment of a distribution of sensor information from a monitored location to customers.

In the present disclosure, it is recognized that a distribution of sensor information to customers can be based on customized alert functions and/or customized transformation functions for one or more sensor channels of data. FIG. 8 illustrates an example embodiment of a distribution of sensor information from a monitored location to customers. In the illustrated example, a destination can be embodied as dashboard 842, which receives sensor channel information from publisher 841.

As illustrated, publisher 841 is coupled to gateway 820 at monitored location 810. The connection of gateway 820 with publisher 841 enables the collection of sensor data by publisher 841 from monitored location 810. In one embodiment, publisher 841 can be located in a location remote from gateway 820. In one embodiment, dashboard 842 can represent a streaming URL that can receive JavaScript Object Notation (JSON) formatted packets. In one embodiment, JSON is a lightweight data-interchange format that facilitates the transmission of sensor channels of data/information to subscribing destinations. One example of a JSON formatted packet is as follows:

| | |
|---|---|
| {"data": [ | |
| {"pkt": x, | Packet number for the Node sending the data |
| "raw": x, | Raw value captured by the sensor |
| "ts": x, | Timestamp at which the data was captured |
| "value": x | Converted value captured by the sensor |
| }, | |
| {"pkt": y, | Multiple packets can be send in one JSON object |
| "raw": y, | |
| "ts": y, | |
| "value": y | |
| } ], | |
| "location": "x", | Location where the Node capturing the data is installed |
| "mod": x, | ID of the Node capturing the data |
| "pos": x, | Channel on the Node/sensor where the sensor data is captured |
| "sid": x, | Sensor ID of the sensor capturing the data |
| "site" : "x", | Name of the Site where the Node is installed |
| "sn": "x", | Gateway Serial Number of the Site where the Node is installed |
| "type": "x", | Type of data captured by the sensor |
| "transform": "x", | Name of the conversion function from raw to converted value |
| "ts": x, | Timestamp when the JSON packet is sent |
| "unit": "x" | Units of the converted value captured by the sensor |
| "subscription_id": "x" | Data Stream subscription ID |
| } | |

The JSON formatted packet includes data/information generated by a combination of the sensor module unit, wireless node and publisher 841. The JSON formatted packet enables dashboard 842 to assemble information for the streaming URL.

Figure 9:
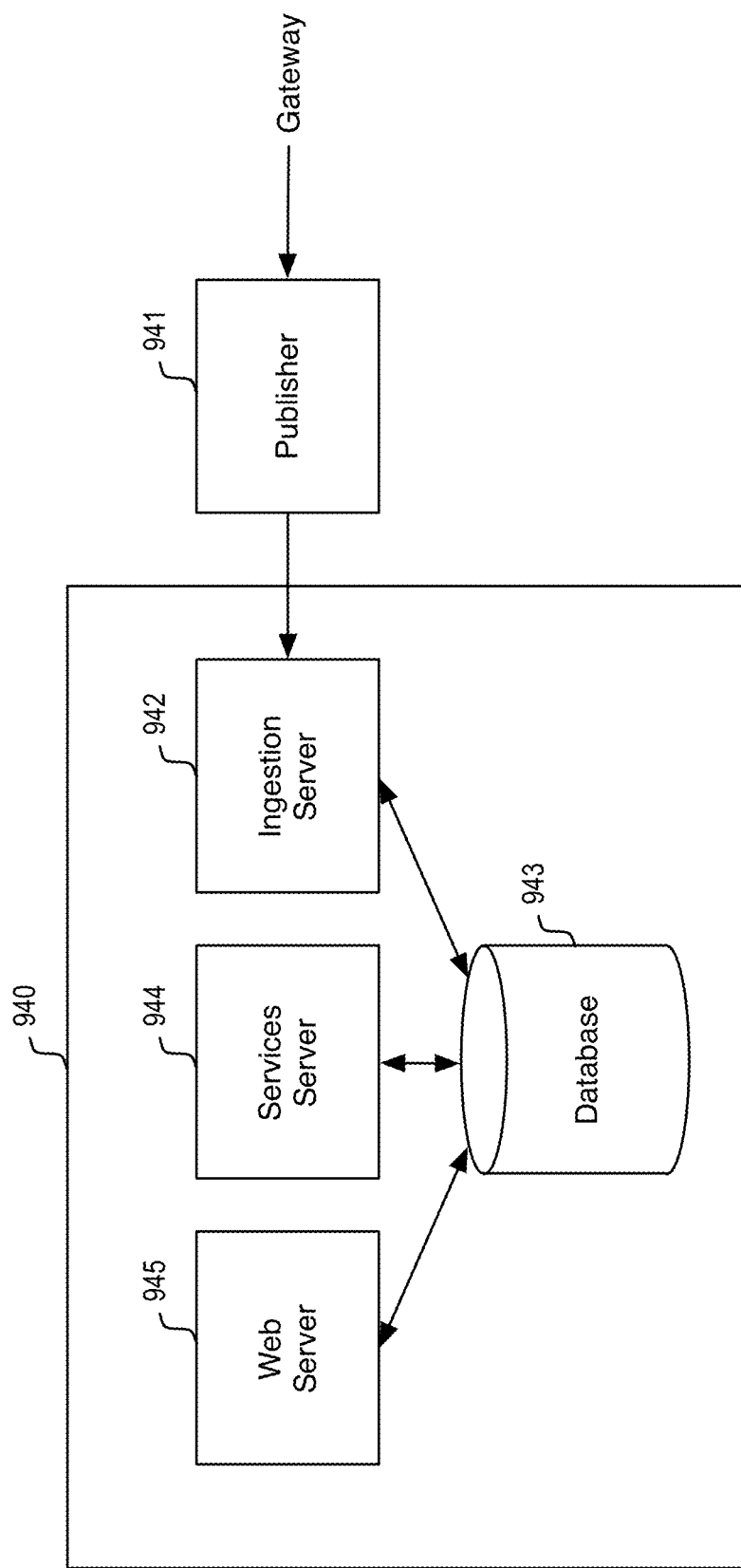
FIG. 9 illustrates an example embodiment of a distribution service.

FIG. 9 illustrates an example implementation of a distribution service. As illustrated, services 940 includes ingestion server 942, which receives wireless sensor network information from publisher 941. The wireless sensor network information can include any information that is associated with the wireless sensor network at the monitored location. In one embodiment, ingestion server 942 can be configured to receive JSON packets from publisher 941 and to store the wireless sensor network information in database 943. Database 943 can be accessed by both services server 944 and web server 945. In one embodiment, services server 944 can be used to monitor sensor data/information that is stored in database 943 and generate alerts (e.g., email, text, phone, or other notification mechanism) that are independent of a web user interface. Finally, web server 845 can be used to generate system interfaces (e.g., configuration) and a dashboard interface via the web.

One of the system interfaces enables a user to specify a transformation function for a particular sensor channel of data. The specified transformation function can be provided to publisher 941 and stored in accordance with an identifier based on a gateway identifier, a wireless node identifier, a port identifier and a sensor identifier. Publisher 941 can then apply the specified transformation function to a particular sensor channel of data. In alternative embodiments, the transformation function can be applied at any point in the distribution path.

Another of the system interfaces enables a user to specify an alert function for one or more sensor channels of data. The alert function definition can be stored by services server 944 and web server 945 in accordance with an identifier based on a gateway identifier, a wireless node identifier, a port identifier and one or more sensor identifiers. As noted, specified alert functions can be accessed by services server 944 to generate alerts that are independent of a web user interface. Specified alert functions can also be used by web server 945 in generating alerts as part of the web user interface.

Figure 10:
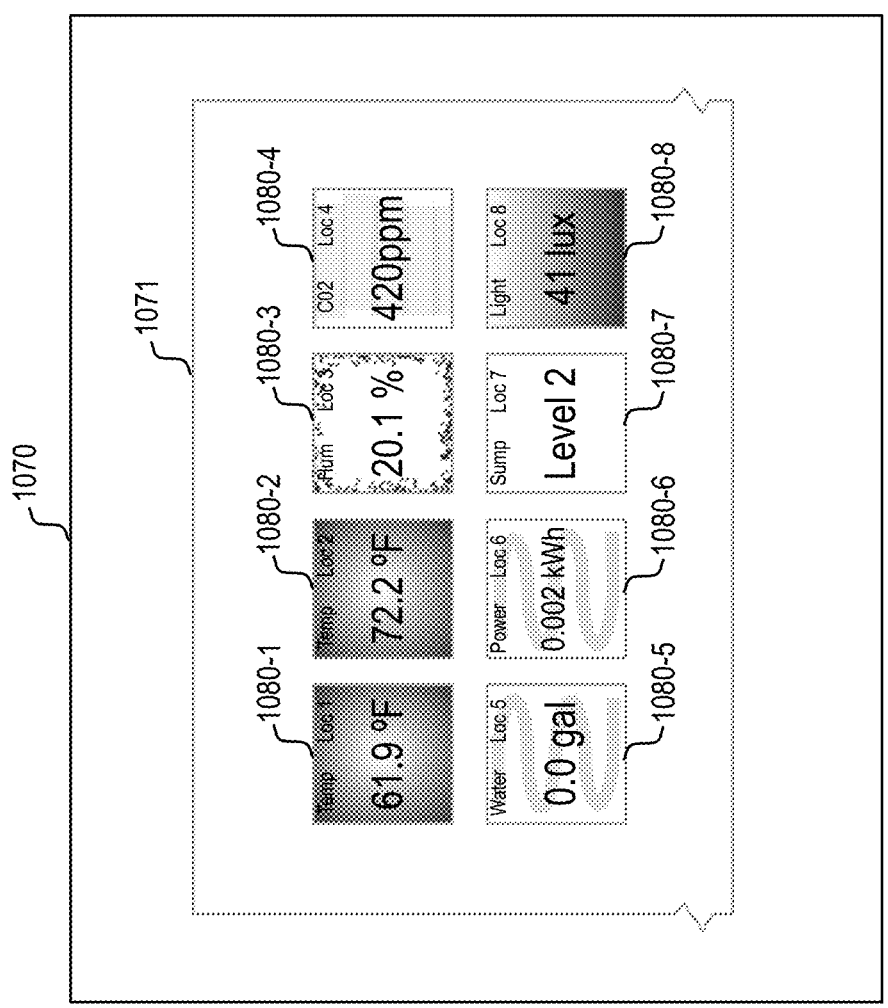
FIG. 10 illustrates an example embodiment of a dashboard.

As would be appreciated, the specific implementation of the distribution service can vary. Regardless of the particular form of the distribution service, a dashboard interface can be produced that enables a customer to receive customized sensor information and alerts. An example of such a user interface is illustrated in FIG. 10.

In the illustrated example, customer device 1070 (e.g., personal computer, tablet, mobile phone, or other computing device) can be configured to receive computer readable program code from a web server that enables a display of user interface 1071. User interface 1071 can include multiple tiles 1080-n, wherein each individual tile includes information associated with a single sensor channel of data. For example, tile 1080-1 and 1080-2 include information related to sensor channels of data associated with two different temperature sensors, tile 1080-3 includes information related to a sensor channel of data associated with a humidity sensor, tile 1080-4 includes information related to a sensor channel of data associated with an air quality sensor, tile 1080-5 includes information related to a sensor channel of data associated with a pulse sensor attached to a water meter, tile 1080-6 includes information related to a sensor channel of data associated with a pulse sensor attached to an electricity meter, tile 1080-7 includes information related to a sensor channel of data associated with a sump pump level sensor, and tile 1080-8 includes information related to a sensor channel of data associated with a light sensor. Each of tiles 1080-1 to 1080-8 enable a user to view real-time information related to a set of sensor channels of data associated with the dashboard destination.

In one embodiment, when a user interface element (e.g., pointer) hovers over a tile, further user interface control elements (e.g., arrows and graph buttons) can appear, which enable the user to access different views in the tile, which can display further sensor channel information such as average per time period (e.g., hour, day, week, or other specified period of time), trend information, alert history, or other composite sensor channel information. In one embodiment, the further sensor channel information can be produced using customized transformation functions that are applied to a sensor channel of data. In one example, the user can also access a graph of the data that has been recorded for the sensor channel of data. The user can select any time period since the sensor channel of data has been recorded along with a time scale for the selected time period. As such, the user can view the current conditions reflected by the sensor channel of data in the context of the historical measurements recorded for the sensor channel of data.

In one embodiment, the background color or imaging of an individual tile can change based on an analysis of the received sensor channel of data or the received transformed sensor channel of data. In another embodiment, a textual message can be displayed in or around an individual tile based on an analysis of the received sensor channel of data or the received transformed sensor channel of data. In general, any change to the user interface based on an analysis of the received sensor channel of data can serve as an alert in the context of the user interface.

Alerts are produced using a defined alert function that is applied to raw and/or transformed sensor channels of data. In one example, an alert function can identify one or more thresholds to which raw or transformed sensor data can be compared. This alert threshold function represents a simple form of alert function that can be applied to a monitored value. As noted, in more complex scenarios, an alert function can be defined that analyzes a composite of multiple sensor channel data values. In one example, the alert function can analyze multiple values from a single sensor channel of data in determining a monitored value such as a moving average, a rate of change, or any factor inclusive of multiple sensor channel data values. In another example, the alert function can analyze multiple values from a plurality of sensor channels of data. In the example noted above, an alert function can be defined to analyze multiple sensor channels of data that are combined into a single monitored value (e.g., alert analysis based on a monitored value produced by the fxn(sensor1, sensor2, . . . sensorN)), or can be defined to analyze multiple monitored conditions (e.g., (sensor1>X1 AND sensor2>X2) OR sensor3<X3). As would be appreciated, the particular form of the alert function would be implementation dependent.

In the present disclosure, it is recognized that an alert function can be customized to particular sensor channel(s) of data. For example, a first alert threshold applied to a first temperature sensor channel of data can be different to a second alert threshold applied to a second temperature sensor channel of data. Alert functions can be defined for each sensor channel of data in a manner similar to the configuration of a transformation function. It should be noted, however, that different alert functions can be applied to the same sensor channel that produces raw or transformed data to meet the needs of a particular destination. As such, the alert function definitions can be defined not only on the basis of a gateway identifier, node identifier, port identifier and sensor identifier, but also on the basis of a destination identifier.

As noted, alert definition functions can be stored based on configuration information received via a user interface. The alert definition functions can be provided to the dashboard destination to analyze sensor channel information included in the JSON formatted packets. In one example, the alert definition functions can be implemented by the dashboard in a JavaScript script on a client device. When the alert definition function indicates that an alert should be signaled, then the JavaScript signals that a change in the user interface should occur (e.g., change in background tile color or imaging). In another example, the alert function can be implemented by a Java program on a server device.

Figure 11:
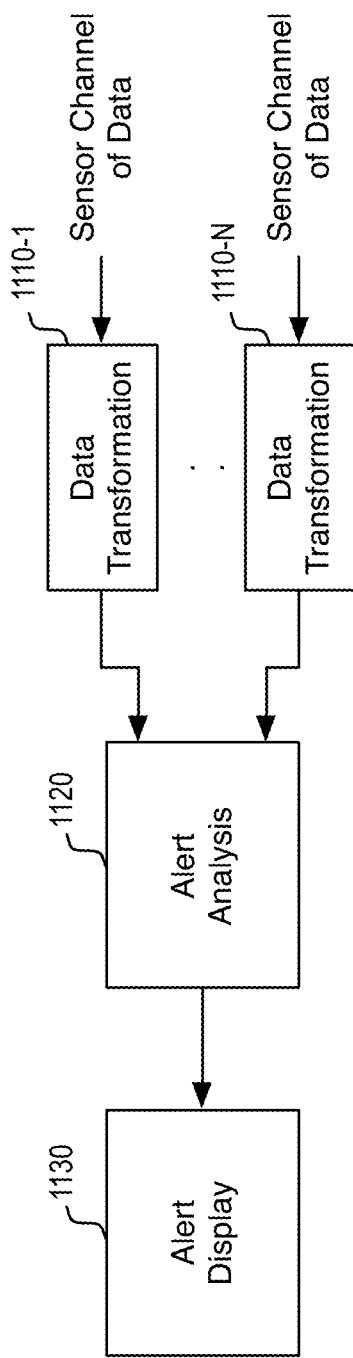
FIG. 11 illustrates an example embodiment of a data flow.

Having described a framework for the distribution of sensor information, reference is now made to FIG. 11, which illustrates an example data flow. The data flow begins with one or more individually identified sensor channels of data. In the illustrated example, a plurality of individual sensor channels of data have been identified as inputs into a customized alert generation process. Each individual sensor channel of data can be produced by a separate sensor. As a group, the plurality of individual sensor channels of data can originate from one or more sensor module units that are attached to one or more wireless nodes at one or more monitored locations.

In one example, each individual sensor channel of data can have a customized data transformation function defined for application to that sensor channel of data. As such, the customized data transformation function can be associated with an individual sensor channel of data. In one embodiment, a data transformation function is stored based on an identifier that includes a gateway identifier, a wireless node identifier, a port identifier and a sensor identifier. If a data transformation function has been defined, it can be applied by a first device (e.g., publisher) to the raw sensor data to produce transformed sensor data. For example, data transformation function 1110-1 can be applied to a first sensor channel of data while a different data transformation function 1110-N can be applied to a separate sensor channel of data. As would be appreciated, distinct data transformation functions can be defined separately for as many sensor channels of data that are included in an alert analysis.

Alert analysis 1120 can be configured to receive inputs based on one or more sensor channels of data. If a single input based on one sensor channel of data is used, then alert analysis 1120 can be relatively simple. For example, alert analysis can implement a threshold comparison function to an input based on the sensor channel of data. In more complex scenarios, alert analysis can be configured to receive a plurality of inputs based on a corresponding plurality of sensor channels of data. As would be appreciated, the inputs can represent any combination of raw and transformed data values. Alert analysis 1120 can analyze the plurality of inputs using a defined alert function such as those described above. As would be appreciated, an alert analysis based on a plurality of sensor channels of data can be defined to identify any particular change in the monitored location as reflected by one or more sensor channels of data.

Alert analysis 1120 can be configured to produce an alert trigger. In one embodiment, this alert trigger can be used to effect a change in a user interface at a device that receives and displays a stream of raw or transformed data values. This change in the user interface can signal a change in status to a user of the viewing device. In various examples, the change in status can be represented by a change in color of a user interface element on the viewing device, a change in visibility of a user interface element on the viewing device, a textual message on the viewing device, or any other signal on the viewing device that can provide an alert to the user. In various examples, the change can be triggered by a server device or a client device. In another embodiment, the change in status can be reflected apart from a change in a user interface on a viewing device. For example, the alert trigger can initiate an email, text, phone, or other notification mechanism.

As has been described, the distribution of wireless sensor network information can be based on customized transformation and alert functions. The customized distribution addresses divergent interests and needs of customers in monitoring particular conditions at a monitored location.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:
1. A monitoring system, comprising:
a monitoring device that supports a sensor, the monitoring device configured to provide a sensor channel of data containing raw sensor data values captured by the sensor;
a publisher configured to collect the raw sensor data values from the monitoring device, to retrieve a transformation function associated with the sensor channel of data, and to generate transformed sensor data values from the raw sensor data values using the retrieved transformation function, wherein the transformed sensor data values are associated with a transformed sensor channel of data;
a database configured to store the raw sensor data values as a first timeseries of raw sensor data, and to store the transformed sensor data values as a second timeseries of transformed sensor data; and
one or more web servers configured to transmit computer readable program code that enables a viewing device to display a user interface having a first user interface element that enables a display of at least part of the first timeseries of raw sensor data and a second user interface element that enables a display of at least part of the second timeseries of transformed sensor data.

2. The monitoring system of claim 1, wherein the monitoring device is a wireless monitoring device.

3. The monitoring system of claim 1, wherein the publisher collects the raw sensor data values from a gateway device.

4. The monitoring system of claim 1, wherein the publisher collects a timestamp for each raw sensor data value.

5. The monitoring system of claim 4, wherein the timestamp is generated by the monitoring device.

6. The monitoring system of claim 1, wherein the sensor is an air quality sensor.

7. The monitoring system of claim 6, wherein the monitoring device has a set of sensors including a temperature sensor, a humidity sensor and a carbon dioxide sensor, and the publisher is configured to collect raw sensor data values from the set of sensors.

8. A method, comprising:
generating, by a monitoring device that supports a sensor, a sensor channel of data containing raw sensor data values captured by the sensor;
collecting, by a publisher, the raw sensor data values;
retrieving, by the publisher, a transformation function associated with the sensor channel of data;
generating, by the publisher, transformed sensor data values from the raw sensor data values using the retrieved transformation function, wherein the transformed sensor data values are associated with a transformed sensor channel of data;
storing, in a database, the raw sensor data values as a first timeseries of raw sensor data and the transformed sensor data values as a second timeseries of transformed sensor data; and
transmitting, by one or more web servers, computer readable program code that enables a viewing device to display a user interface having a first user interface element that enables a display of at least part of the first timeseries of raw sensor data and a second user interface element that enables a display of at least part of the second timeseries of transformed sensor data.

9. The method of claim 8, wherein the generating comprises generating by a wireless monitoring device.

10. The method of claim 8, wherein the collecting comprises collecting from a gateway device.

11. The method of claim 8, wherein the collecting comprises collecting a timestamp for each raw sensor data value.

12. The method of claim 11, wherein the timestamp is generated by the monitoring device.

13. The method of claim 8, wherein the sensor is an air quality sensor.

14. The method of claim 13, wherein the collecting comprises collecting raw sensor data values from a set of sensors in the monitoring device having a temperature sensor, a humidity sensor and a carbon dioxide sensor.

15. A monitoring system, comprising:
an air quality monitoring device that supports a set of sensors having a temperature sensor, a humidity sensor and a carbon dioxide sensor, the air quality monitoring device configured to provide a first sensor channel of data containing raw sensor data values captured by the temperature sensor, a second sensor channel of data containing raw sensor data values captured by the humidity sensor, and a third sensor channel of data containing raw sensor data values captured by the carbon dioxide sensor;
a publisher configured to collect the first raw sensor data values, the second raw sensor data values, and the third raw sensor data values from the monitoring device, to retrieve a transformation function associated with one of the first, second, or third sensor channel of data, and to generate transformed sensor data values from the raw sensor data values in the one of the first, second, or third sensor channel of data using the retrieved transformation function, wherein the transformed sensor data values are associated with a transformed sensor channel of data;
a database configured to store the raw sensor data values of the temperature sensor as a first timeseries of raw sensor data, to store the raw sensor data values of the humidity sensor as a second timeseries of raw sensor data, to store the raw sensor data values of the carbon dioxide sensor as a third timeseries of raw sensor data, and to store the transformed sensor data values as a fourth timeseries of transformed sensor data; and
one or more web servers configured to transmit computer readable program code that enables a viewing device to display a user interface having a first user interface element that enables a display of at least part of the first timeseries of raw sensor data, a second user interface element that enables a display of at least part of the second timeseries of raw sensor data, a third user interface element that enables a display of at least part of the third timeseries of raw sensor data, and a fourth user interface element that enables a display of at least part of the fourth timeseries of transformed sensor data.

16. The monitoring system of claim 15, wherein the monitoring device is a wireless monitoring device.

17. The monitoring system of claim 15, wherein the publisher collects the raw sensor data values from a gateway device.

18. The monitoring system of claim 15, wherein the publisher collects a timestamp for each raw sensor data value.

19. The monitoring system of claim 18, wherein the timestamp is generated by the monitoring device.

20. The monitoring system of claim 15, wherein the retrieved transformation function averages raw sensor data values over a time period.

* * * * *